(12) United States Patent
Schlachter

(10) Patent No.: US 7,659,478 B2
(45) Date of Patent: Feb. 9, 2010

(54) ELECTRICAL SWITCH BOX

(76) Inventor: Drue Schlachter, 160 Lazy Lake Dr., Fall River, WI (US) 53932

( * ) Notice: Subject to any disclaimer, the term of this patent is extended or adjusted under 35 U.S.C. 154(b) by 0 days.

(21) Appl. No.: 11/543,668

(22) Filed: Oct. 5, 2006

(65) Prior Publication Data

US 2008/0083551 A1 Apr. 10, 2008

(51) Int. Cl.
*H01H 9/02* (2006.01)
(52) U.S. Cl. .......................... 174/58; 174/50; 174/480; 174/53; 220/3.2; 220/3.3; 248/906
(58) Field of Classification Search ................ 174/480, 174/481, 50, 53, 57, 58, 54, 61, 63, 62; 220/3.2–3.9, 220/4.02; 248/906; D13/152
See application file for complete search history.

(56) References Cited

U.S. PATENT DOCUMENTS

| | | | |
|---|---|---|---|
| 1,056,759 A | 3/1913 | Mallery | |
| 1,156,885 A | 10/1915 | Caine | |
| 1,550,327 A | 8/1925 | William | |
| 1,782,546 A | 11/1930 | Charles | |
| 1,790,031 A | 1/1931 | Vaughn | |
| 1,800,813 A | 4/1931 | Sommerville | |
| 1,850,616 A | 3/1932 | Louis | |
| 1,853,228 A * | 4/1932 | Rlichardson | 248/906 |
| 2,252,953 A | 8/1941 | Walters | |
| 2,299,674 A | 10/1942 | Austin, Jr. | |
| 2,963,253 A | 12/1960 | William | |
| 3,425,655 A | 2/1969 | Cogdill | |
| 3,518,421 A | 6/1970 | Cogdill | |
| 3,528,636 A | 9/1970 | Schmidt | |
| 4,165,443 A * | 8/1979 | Figart et al. | 174/53 |
| 4,263,472 A * | 4/1981 | Maheu | 174/58 |
| 4,428,492 A * | 1/1984 | Jorgensen | 174/53 |
| 4,497,416 A | 2/1985 | Smolik | |
| 4,603,789 A | 8/1986 | Medlin, Sr. | |
| 4,612,412 A * | 9/1986 | Johnston | 174/57 |
| 4,757,967 A | 7/1988 | Delmore | |
| 4,967,990 A | 11/1990 | Rinderer | |
| 5,378,854 A * | 1/1995 | Hoover | 174/53 |
| 5,574,255 A * | 11/1996 | Simmons | 174/53 |
| 5,927,667 A | 7/1999 | Swanson | |
| 6,057,509 A * | 5/2000 | Simmons | 174/53 |
| 6,209,836 B1 | 4/2001 | Swanson | |
| 6,323,424 B1 | 11/2001 | He | |
| 6,903,272 B2 * | 6/2005 | Dinh | 174/58 |

\* cited by examiner

*Primary Examiner*—Angel R Estrada
(74) *Attorney, Agent, or Firm*—Casimir Jones, S.C.

(57) ABSTRACT

This invention relates to electrical switch boxes. In particular, the invention relates to a device having an extension portion connected with a series of electrical switch boxes. In preferred embodiments, the extension portion of the device permits, for example, attachment of the device to a wall stud without flush positioning of the electrical switch boxes with the wall stud.

16 Claims, 2 Drawing Sheets

ELECTRICAL SWITCH BOX

FIELD OF THE INVENTION

This invention relates to electrical switch boxes. In particular, the invention relates to a device having an extension portion connected with a series of electrical switch boxes. In preferred embodiments, the extension portion of the device permits, for example, attachment of the device to a support fixture (e.g., wall stud, wall panel) without flush positioning of the electrical switch boxes with the support fixture.

BACKGROUND

This invention relates generally to devices for supporting electrical switch boxes and, more particularly, to an improved device for mounting electrical switch boxes in a non-flush position with a support fixture (e.g., wall stud).

In the building construction industry, various devices have been used to mount electrical switch boxes in fixed position relative to structural members, including such devices as shown in U.S. Pat. Nos. 1,056,759, 1,156,885, 1,550,327, 1,782,546, 1,790,031, 1,800,813, 1,850,616, 2,252,953, 2,299,674, 2,963,253, 3,425,655, 3,518,421, 3,528,636, 4,603,789, 4,757,967, 4,497,416, 4,967,990, 5,927,667, 6,209,836, and 6,323,424, each herein incorporated by reference in their entireties. However, these devices have drawbacks. For example, some are overly complicated and thus difficult to handle and use. Others require the use of power tools to attach an electrical box to the device. Still others cannot accommodate electrical boxes of different depths. Accordingly, there is a need in the industry for improved electrical switch boxes.

SUMMARY OF THE INVENTION

This invention relates to electrical switch boxes. In particular, the invention relates to a device having an extension portion connected with a series of electrical switch boxes. In preferred embodiments, the extension portion of the device permits, for example, attachment of the device to a wall stud without flush positioning of the electrical switch boxes with the wall stud.

In certain embodiments, the present invention provides a device comprising an extension portion connected with a first electrical switch, wherein the extension portion is configured for attachment with a support fixture such that the first electrical switch is positioned apart from the support fixture.

In some embodiments, the first electrical switch box is configured to receive and secure an electrical switch. In some embodiments, the first electrical switch box is further connected with a second electrical switch box. In some embodiments, the second electrical switch box is further connected with a third electrical switch box.

In some embodiments, the first electrical switch box is further connected with an array of electrical switch boxes positioned in a sequentially linear arrangement. In some embodiments, wherein the array of electrical switch boxes comprises at least two electrical switch boxes. In some embodiments, the array of electrical switch boxes is four electrical switch boxes.

In some embodiments, the extension portion has a width of at least 0.5 inches. In some embodiments, wherein the width is 1.5 inches.

In some embodiments, the support fixture is a wall panel, a wall stud, or door panel.

In certain embodiments, the present invention provides a device comprising an extension portion connected with an array of electrical switch boxes, wherein the extension portion is configured for attachment with a support fixture such that the array of electrical switch boxes is positioned apart from the support fixture.

In some embodiments, the array of electrical switch boxes comprises at least two electrical switch boxes. In some embodiments, the at least two electrical switch boxes is three electrical switch boxes. In some embodiments, the array of electrical switch boxes is arranged in a sequentially linear manner.

DETAILED DESCRIPTION

The present invention relates to electrical switch boxes. In particular, the invention relates to a device having an extension portion connected with a series of electrical switch boxes. In preferred embodiments, the extension portion of the device permits, for example, attachment of the device to a wall stud without flush positioning of the electrical switch boxes with the wall stud.

Typical electrical switch boxes require flush positioning of the boxes with support fixtures (e.g., wall studs). At times, however, it is undesirable to have positioning of the electrical switch boxes flush with support fixtures. For example, if the support fixture is positioned too close to a wall paneling or door trim, positioning of an electrical switch box away from such a support fixture is desired. An undesirable solution for this problem is to provide an additional support fixture attached to the primary support fixture (e.g., to add a new stud to a primary stud). The present invention provides an improved solution for such problems and similar problems. In particular, the devices of the present invention have an extension portion for attachment with support fixtures thereby permitting of electrical switch boxes in a non-flush manner with the support fixture.

Figure 1:
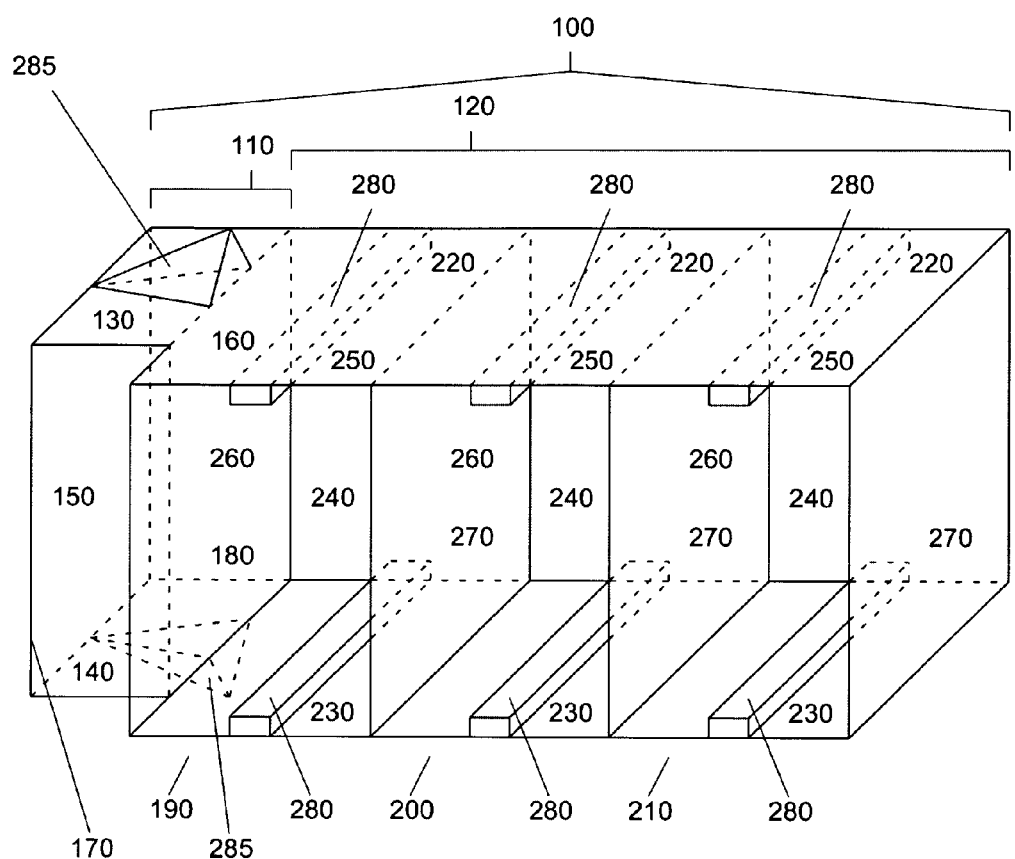
FIG. 1 shows a view of an electrical switch box device of the present invention.
Figure 2:
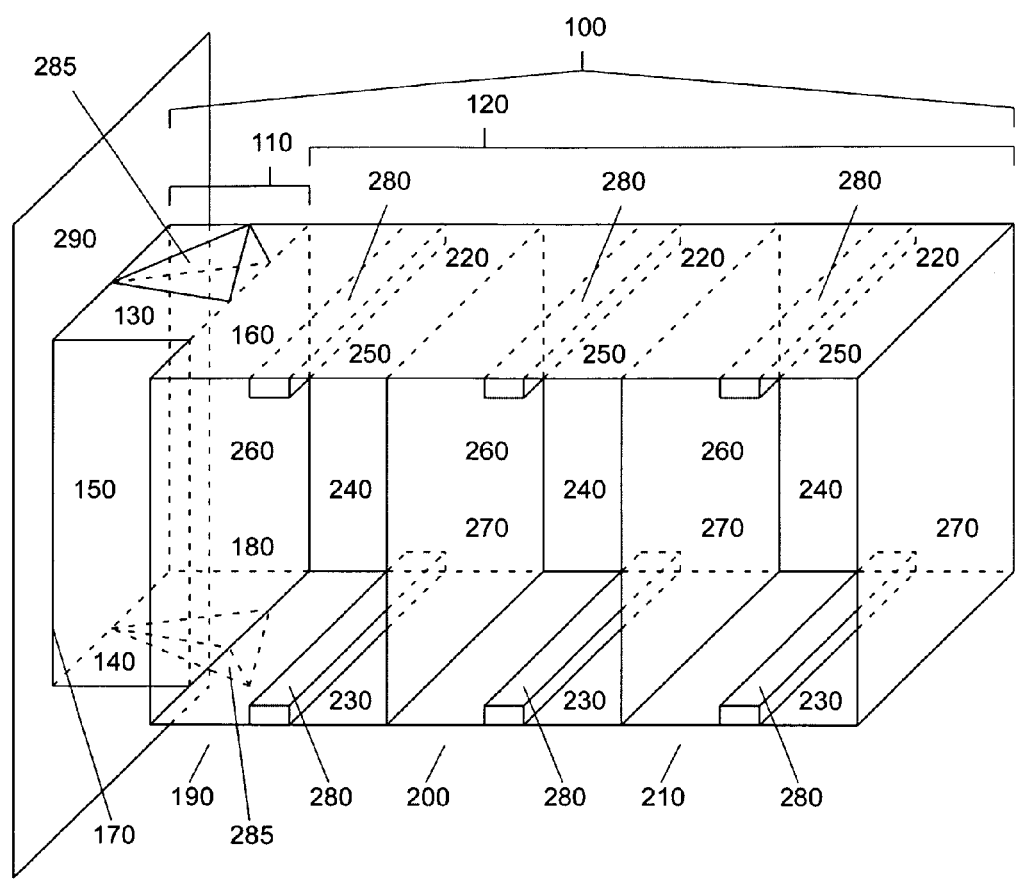
FIG. 2 shows a view of an electrical switch box device of the present invention attached with a support fixture.

FIGS. 1 and 2 illustrate various preferred embodiments of the electrical switch box devices of the present invention. The present invention is not limited to these particular embodiments.

A preferred embodiment of a device 100 of the present invention is provided in FIG. 1. The device 100 is not limited to particular size dimensions. In some embodiments, the height, width and depth are at least a half inch (e.g., 0.5 inches, 1 inch, 1.5 inches, 2 inches, 3 inches, 4 inches, 5 inches, 10 inches). In preferred embodiments, the depth of the device is approximately 3.5 inches and the height 3.5 inches. The device 100 is not limited to a particular material composition (e.g., metal, wood, plastic, or mixture thereof) (e.g., reinforced phenolic). In some embodiments, the material composition of the device is metal (e.g., aluminum). The device is not limited to a particular function. In preferred embodiments, the device 100 is configured for attachment with a support fixture (e.g., wall stud, door panel) and is configured to receive at least one electrical switch such that the received electrical switch(es) are not flush with the support fixture. In preferred embodiments, the device 100 comprises an extension portion 110 and an electrical switch box portion 120.

Still referring to FIG. 1, the extension portion 110 has an extension portion top face 130, an extension portion bottom face 140, an extension portion front face 150, an extension portion back face 160, an extension portion proximal side face 170, and an extension portion distal side face 180. In some embodiments, the extension portion 110 is hollow. In some embodiments, the extension portion 110 is partially hollow. In some embodiments, the extension portion 110 is non-hollow.

Still referring to FIG. 1, the extension portion 110 is not limited to particular size dimensions. In some embodiments, the width of the extension portion 110 is at least a half inch (e.g., 0.5 inches, 1 inch, 1.5 inches, 2 inches, 3 inches, 4 inches, 5 inches, 10 inches). In some embodiments, the height and length of the extension portion 110 is consistent with the height and length of the electrical switch box portion 120. In some embodiments, as shown in FIG. 1, the width of the extension portion 110 is less than the width of the electrical switch box portion 120 (e.g., shorter by 0.1 inches, 0.5 inches, 0.75 inches, 1 inch, 2 inches, 5 inches . . . ). In preferred embodiments, the size of the extension portion 110 permits attachment of the device 100 onto a support fixture (e.g., wall panel, wall stud).

Still referring to FIG. 1, the electrical switch box portion 120 comprises at least one electrical switch box (e.g., gang). The electrical switch box portion 120 is not limited to a particular volume. In some embodiments, the electrical switch box portion 120 has approximately 16.25 cu inches per switch box. In some embodiments, the volume of the electrical switch box portion 120 is sufficient to receive and secure at least one electrical switch. The electrical switch box portion 120 is not limited to a particular number of electrical switch boxes (e.g., gangs). In some embodiments, the electrical switch box portion 120 has two electrical switch boxes. As shown in FIG. 1, the electrical switch box portion 120 has a first electrical switch box 190, a second electrical switch box 200, and a third electrical switch box 210.

Still referring to FIG. 1, the first, second and third electrical switch boxes 190, 200, and 210, each have an electrical switch box top face 220, electrical switch box bottom face 230, an electrical switch box front face 240, an electrical switch box back face 250, an electrical switch box proximal face 260, and an electrical switch box distal face 270. The electrical switch box portion 120 is not limited to a particular arrangement of the electrical switch boxes. In some embodiments, as shown in FIG. 1, the electrical switch boxes are arranged in a linear manner such that the electrical switch box proximal face 260 of the first electrical switch box 190 is flushly positioned with the extension portion proximal face 180, the electrical switch box distal face 270 of the first electrical switch box 190 flushly positioned with the electrical switch box proximal face 260 of the second electrical switch box 200, and the electrical switch box distal face 270 of the second electrical switch box 200 flushly positioned with the electrical switch box proximal face 260 of the third electrical switch box 210.

Still referring to FIG. 1, the electrical switch boxes (e.g., 190, 200, 210) of the present invention are not limited to particular sizes. In preferred embodiments, each electrical switch box of an electrical switch box portion 120 has identical size dimensions. In some embodiments, the size of the electrical switch boxes of an electrical switch box portion 120 are varied so as to receive electrical switches of varied size. The electrical switch boxes within an electrical switch box portion 120 are not limited to particular a particular shape. In preferred embodiments, the shape of the electrical switch boxes within an electrical switch box portion 120 are designed to receive electrical switches. In some embodiments, the electrical switch boxes have therein portions to guide wires from received electrical switch boxes.

Still referring to FIG. 1, in some embodiments, each electrical switch box portion 120 further comprises electrical switch box portion tabs 280. The electrical switch box portion 120 is not limited to a particular number of electrical switch box portion tabs 280. In some embodiments, the electrical switch box portion 120 has two electrical switch box portion tabs 280. The electrical switch box portion tabs 280 are not limited to a particular position location within an electrical switch box portion 120. In preferred embodiments, the electrical switch box portion tabs 280 are positioned along the center of the electrical switch box portion top face 220 and bottom face 230. The electrical switch box portion tabs 280 are not limited a particular function. In some embodiments, the electrical switch box portion tabs 280 are used to assist in positioning an electrical switch box within the electrical switch box portion 120. In some embodiments, the electrical switch box portion tabs 280 are designed with screw wells for receiving screws from electrical switch boxes.

FIG. 2 shows an electrical switch box device 100 of the present invention attached with a support fixture 290 (e.g., wall stud, wall panel, door panel). As shown, the electrical switch box device 100 has an extension portion 110 with an extension portion proximal face 170, and an electrical switch box portion 120. The extension portion 110 is not limited to a particular manner of attachment with the support fixture 290. In some embodiments, the extension portion 110 attaches with a support fixture 290 via, for example, nails, glue, cement, screws, etc. In some embodiments, as shown in FIG. 2, the extension portion 110 further comprises nail-on portions and/or screw-on portions 285 for attachment with the support fixture 290. As shown in FIG. 2, the extension portion the electrical switch device 100 is attached onto the support fixture 290 such that the extension portion proximal face 170 is flushly positioned with the support fixture 290, and the electrical switch box portion 120 is positioned apart from the support fixture 290.

The devices of the present invention provide an improvement over electrical switch boxes that require positioning onto a support fixture. The devices of the present invention permit attachment onto a support fixture with the positioning of the electrical switch boxes apart from the support fixture. As such, devices having an extension portion of, for example, 2 feet permit positioning of electrical switch boxes 2 feet from the support fixture. As the present invention provides a positioning solution for electrical switch boxes that does not required the attachment of, for example, a second support fixture onto the primary support fixture, the present invention represents a significant improvement over the prior art.

All publications and patents mentioned in the above specification are herein incorporated by reference. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

I claim:

1. A device for mounting electrical switches comprising a hollow extension portion extending laterally from a first electrical switch box, wherein said extension portion is configured for attachment with a support fixture so that said extension portion is disposed between said first electrical switch box and said support fixture and said first electrical switch box is positioned a predetermined distance from said support fixture and wherein the width and depth of said extension portion is less than the width and depth of said first electrical switch box so that said extension portion cannot accommodate an electrical switch.

2. The device of claim 1, wherein said first electrical switch box is configured to receive and secure an electrical switch.

3. The device of claim 1, wherein said first electrical switch box is further connected with a second electrical switch box.

4. The device of claim 3, wherein said second electrical switch box is further connected with a third electrical switch box.

5. The device of claim 1, wherein said first electrical switch box is further connected with an array of electrical switch boxes positioned in a sequentially linear arrangement.

6. The device of claim 5, wherein said array of electrical switch boxes comprises at least two electrical switch boxes.

7. The device of claim 6, wherein said array of electrical switch boxes is four electrical switch boxes.

8. The device of claim 1, wherein said extension portion has a width of at least 0.5 inches.

9. The device of claim 1, wherein said support fixture is a wall panel.

10. The device of claim 1, wherein said support fixture is a wall stud.

11. A device for mounting electrical switches comprising a hollow extension portion extending laterally from an array of electrical switch boxes, wherein said extension portion is configured for attachment with a support fixture so that said extension portion is disposed between said array of electrical switch boxes and said support fixture and said array of electrical switch boxes is positioned apart from said support fixture and wherein the width and depth of said extension portion is less than the width and depth of said array of electrical switch boxes so that said extension portion cannot accommodate an electrical switch.

12. The device of claim 11, wherein said array of electrical switch boxes comprises at least two electrical switch boxes.

13. The device of claim 12, wherein said at least two electrical switch boxes is three electrical switch boxes.

14. The device of claim 11, wherein said array of electrical switch boxes is arranged in a sequentially linear manner.

15. The device of claim 11, wherein said support fixture is a wall stud.

16. The device of claim 11, wherein said support fixture is a wall panel.

* * * * *